Nov. 23, 1965 C. C. WAUGH 3,219,046
FLUID RATIO CONTROL
Original Filed Aug. 25, 1960 6 Sheets-Sheet 1
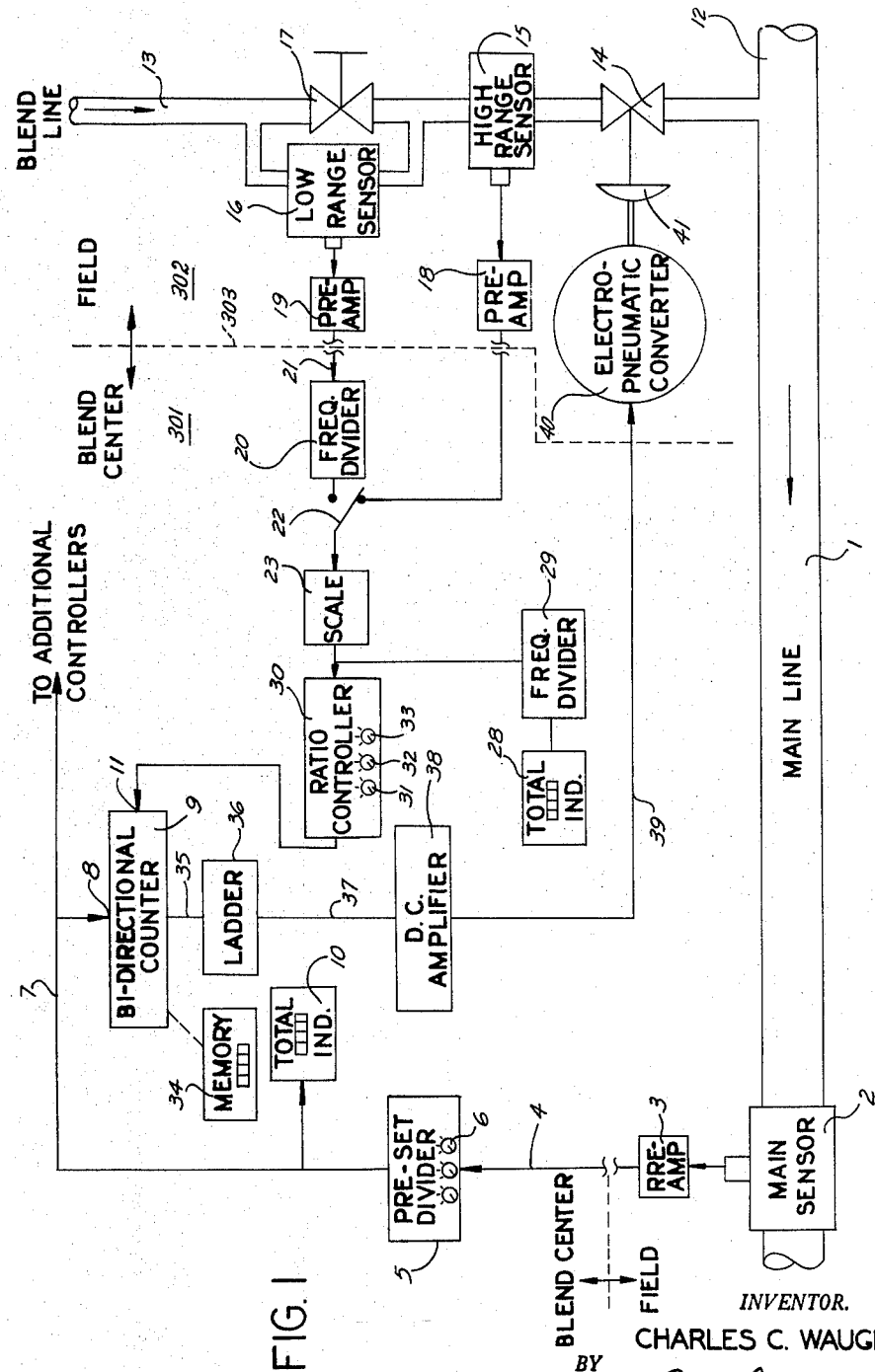
FIG. I
INVENTOR.
CHARLES C. WAUGH
BY
R. E. Geauque
ATTORNEY

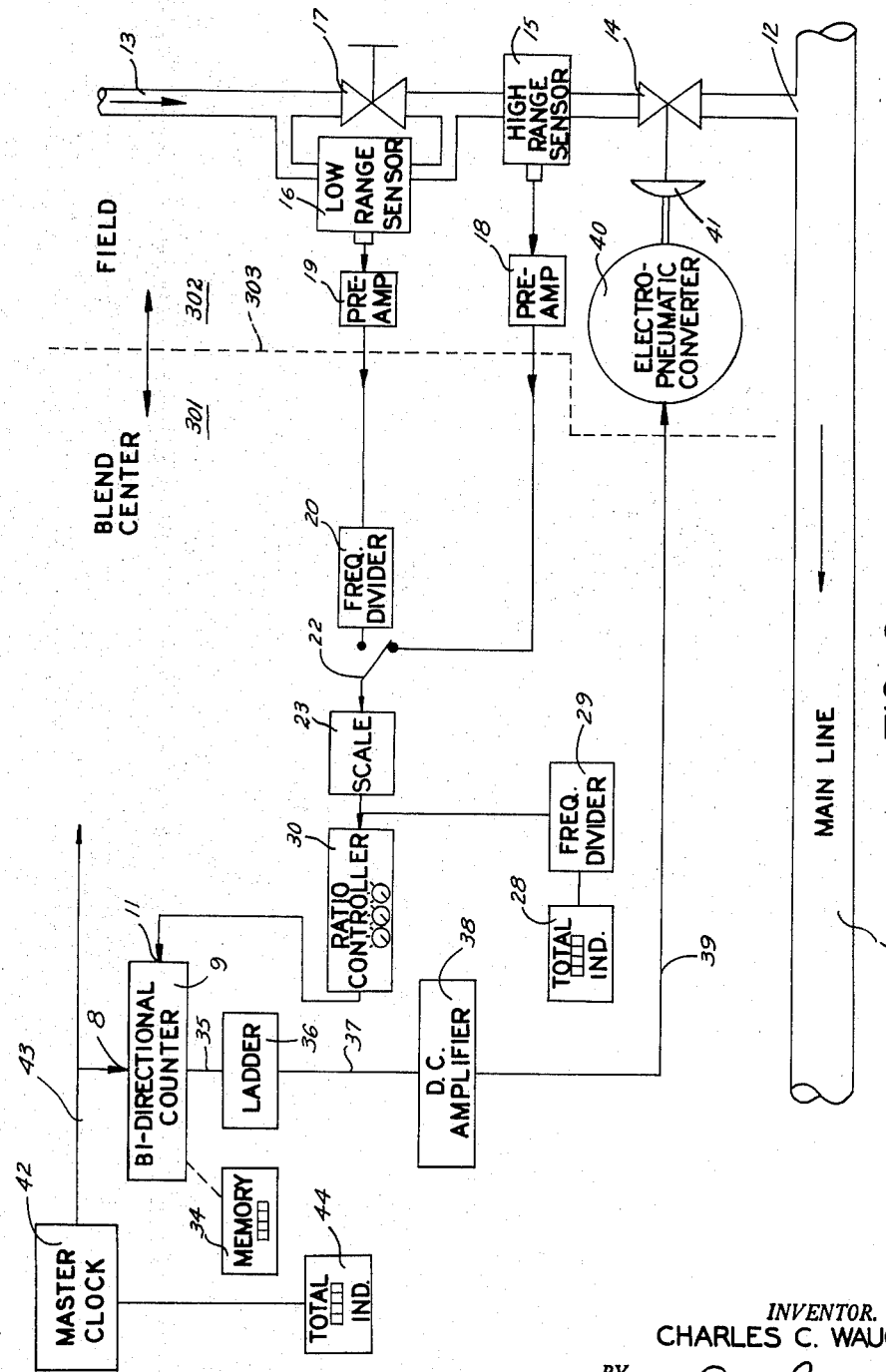

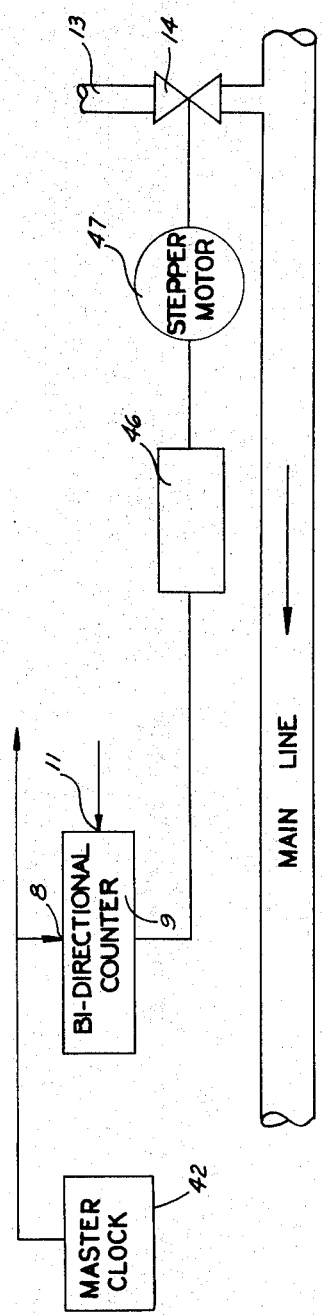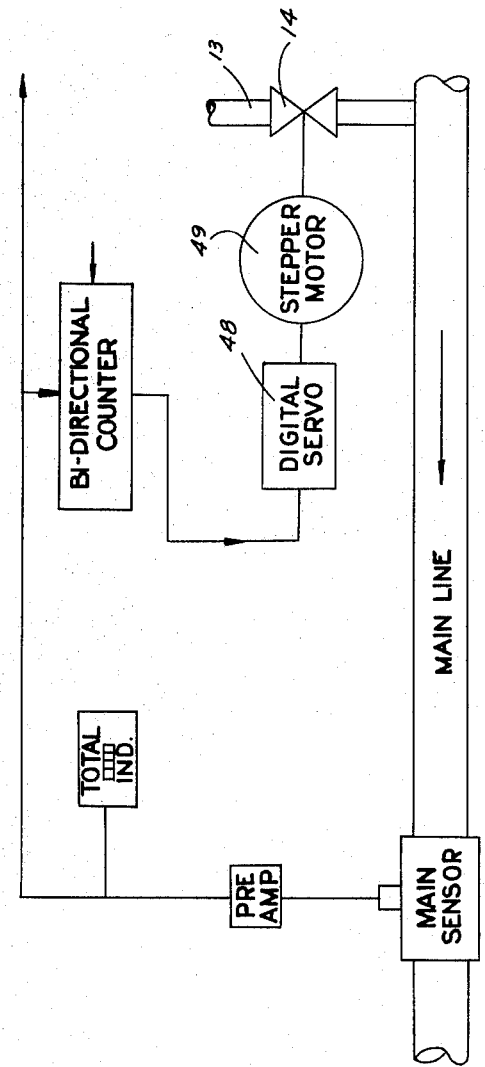

INVENTOR.
CHARLES C. WAUGH
BY R. E. Geauque
ATTORNEY

INVENTOR.
CHARLES C. WAUGH
BY R. E. Geauque
ATTORNEY 3,219,046
FLUID RATIO CONTROL
Charles C. Waugh, Tarzana, Calif., assignor to The Foxboro Company, a corporation of Massachusetts
Original application Aug. 25, 1960, Ser. No. 51,868. Divided and this application Mar. 29, 1961, Ser. No. 99,096
9 Claims. (Cl. 137—8)

This invention relates to a ratio computer and more particularly to a digital ratio computer for continuous process control in which a plurality of input variables having the form of time-digital signals are combined to provide, at the output, a running total comprised of selected proportions of each of the input variables. This application is a division of application Serial No. 51,868, filed August 25, 1960, now abandoned.

A number of digital ratio computers have been proposed heretofore, such computers being especially useful in so called "batch-process" control in which a given number of a first type of items are to be combined with a given number of a second type of items and so forth, until a specified total is reached at which time the batch will be complete and the process cycle may be automatically repeated. Since counting and other arithmetic operations involving discrete numbers are performed by such systems, as contrasted with physical measuring operations, they are referred to as digital systems. Digital techniques have many advantages over measuring or analog techniques in process control; these include a favorable signal-to-noise ratio, the capability of remote operation without degradation of the signal in the transmission channel, and convenience of recording and/or display of process variables. Also, practical digital systems may be constructed having virtually any desired accuracy and resolution whereas practical analog systems generally have less than optimum accuracy and resolution. Digital accuracy is particularly important in those applications in which the process depends on small differences of large quantities. Furthermore, digital systems offer the convenience of being able to preset the process parameters in absolute numerical form.

The apparatus of the present invention totalizes numerically the quantity of materials with relation to the numerical rate of a digital pacing signal. Thus, it is particularly adapted to process control systems in which the materials to be combined in the process exist as separate units which may be counted. It is conttemplated that the present invention may be applied to automatic control systems in which individual items are supplied on separate conveyors, or the like, to be combined to provide a mixture in a receiving channel the total of which is comprised of a given number of the items supplied from the separate conveyors. For example, a first conveyor might supply two nuts for each bolt supplied on a second separate conveyor so that the combined parts may be packaged in any desired total quantity, yet retain the ratio of two nuts to one bolt. By means of the novel apparatus of the present invention, the total number of units counted in a first channel is compared with the accumulated total representing the sum of the first channel and a second channel; this sum may be made to comprise any desired ratio of the two supply channels by dividing the accumulated total by a factor representing the desired ratio of the units in the first channel to the combined total.

Many process control applications have not, heretofore, been considered as lending themselves to digital techniques; for example, the input information may not exist as discrete signals which may be counted. Also, the nature of the materials being handled in the process may be continuous in nature as in the case of fluids. For this reason, fluid blending systems proposed heretofore, in which a plurality of fluids are proportioned in accordance with a preset ratio to provide an end mixture having desired quantities of the plurality of fluids mixed therein, have employed analog control devices. Typical of these analog devices are mechanical differentials whose separate input shafts are caused to rotate by the flow of the fluids to be blended and whose output shaft actuates a valve or other suitable control device controlling the flow of one of the fluids so that it will always flow in the desired proportions to the master fluid. Although electrically actuated valves and other electrical mechanisms have been employed in these prior art systems, they have not employed numerical control of the blending system elements.

Notwithstanding the apparent unsuitability of digital techniques to continuous control of fluid handling processes, digital techniques are particularly adapted to systems based on total flow rather than rate of flow. Fluid blending or proportioning systems are, ideally, controlled in accordance with cumulative total outputs rather than comparing flow rates. This will eliminate cumulative error, whereas an analog system based on rate of flow merely adjusts for deviations in the instantaneous flow rate; the deviation from the correctly proportioned output, until correction takes place, is permanently lost and compensation cannot occur.

Another advantage of a digitally controlled blending system is that the blend ratios may be entered in convenient numerical form and the accuracy of the system, as well as the repeatability of the system, is a precise and predictable amount. Furthermore, an all-digital system will provide an accurate proof of performance on individual totalizers and automatically accumulate the total flow in any and all lines, if for any reason one of the fluids stop or there is a mechanical failure in the equipment. Upon restoring the system to operation after failure, the apparatus of the invention will automatically restore the entire shortage or subtract the overage until the accumulated total at the output is completely satisfied in terms of a correctly proportioned finished product.

In prior systems, referred to above, it has been proposed to use a constant speed motor for a master flow rate controller or pacer adjustable through a desired range. Being in the analog domain, this adjustment has been made via a variable speed device to determine the number of rotations per unit time made by a common shaft from which are driven the respective pacing units to the various components. The present invention provides a means whereby a fluid blending system may be constructed having as the master pacing signal a train of discrete pulses suitable for counting and/or other arithmetic operations. This pulse train may be independently generated, thus defining an "open-loop" system or may be derived by enumerating volumetric units of the mixed fluid this defining a "closed-loop" system.

Nothwithstanding the use of digital techniques, as contrasted with analog techniques, the present invention allows blending of multiple fluids in accurately determined ratios on a continuous rather than a batch process. Either an open-loop or a closed-loop system may be employed and still retain the continuous nature of the process. Electrical signal transmission is used throughout permitting flow sensing transducers and control valves to be located remotely from the blending control center housing the ratio computer.

It is therefore an object of the invention to provide a novel ratio computer for accepting a plurality of input variables in discrete or numerical form and providing as an output a numerical total comprised of preset proportions of the input variables.

It is another object of the invention to provide a ratio computer for continuous process control adapted for receiving as a first input a pulse train of a given frequency, as a second input a pulse-rate modulated signal which is selectively modified by means of a ratio controller, and providing a digital output which is the algebraic sum of the two inputs.

Still another object of the invention is to provide a novel fluid blending system employing a ratio computor having a plurality of inputs and a single output in which the system parameters are operated upon arithmetically.

Still another object of the invention is to provide a novel fluid blending system employing digital techniques in which the selected ratio of the blend fluid or fluids, to the mixed fluid, may be entered directly in numerical form.

Still another object of the invention is to provide a novel fluid blending system in which the system parammeters are arithmetically operated upon by a digital-differential controller to provide a continuous output comprised of predetermined proportions of the input variables.

While the invention is first described as applicable to a fluid blending system embodiment, it should be borne in mind that the novel ratio computer of the invention may be employed in many other types of control applications, as will be evident after having read the following specification and drawings in which:

FIGURE 1 is a block diagram of a closed-loop fluid blending system embodying the novel ratio computer of the invention.

FIGURE 2 is a block diagram of an open-loop fluid blending system embodying the novel ratio computer of the invention.

FIGURE 3 is a modification of the output control portion of the apparatus of the invention, as shown in FIGURE 2.

FIGURE 4 is a modification of the output control position of the apparatus as shown in FIGURE 1.

FIGURE 5 is a block diagram of a bi-directional counter useful in the construction of the invention.

FIGURE 6 is a wave form illustrating the characteristics of the signals appearing in the apparatus of FIGURE 5.

Figure 7:
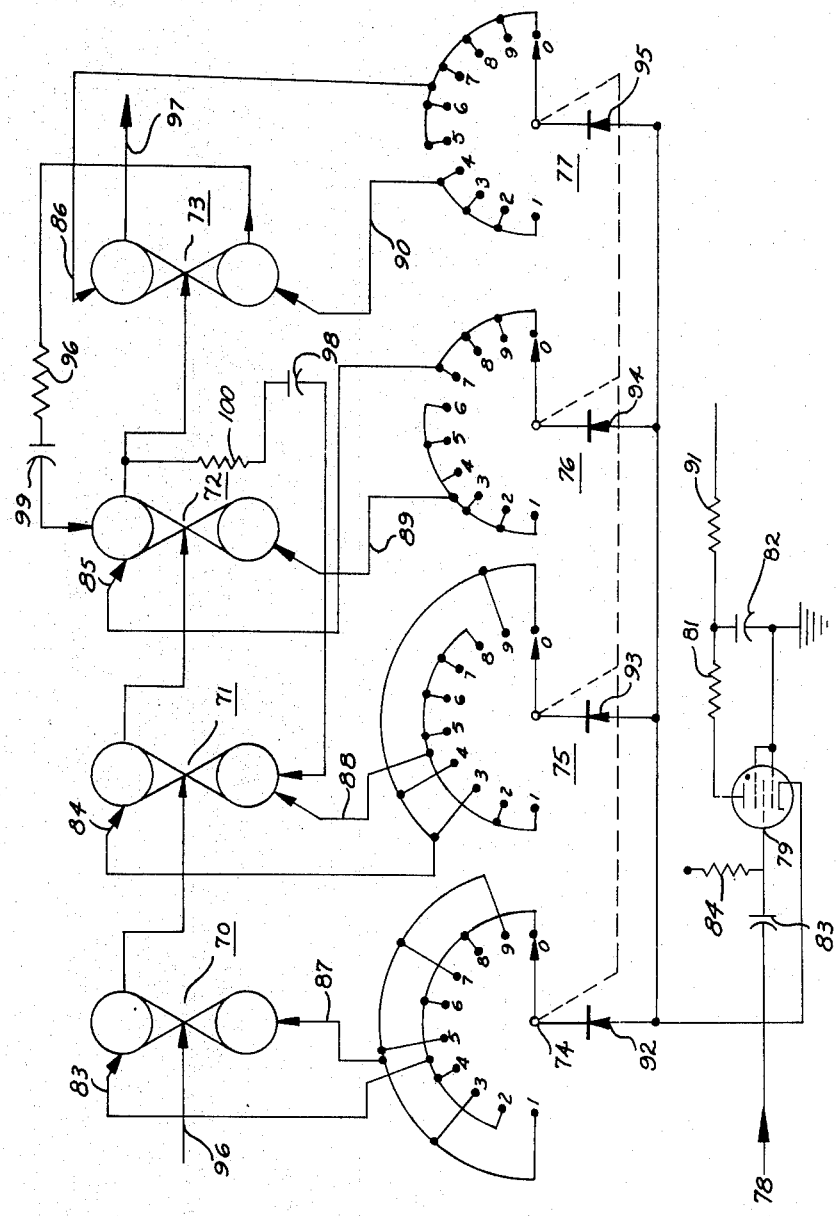
FIGURE 7 is a schematic diagram of a preset counter useful in the construction of the invention.

The fluid-blending system embodiment of the invention may conveniently employ turbine-type flow sensors which provide a time-digital output indicating the total quantity of fluid in each blend line and the total quantity of the combined fluids.

Turbine-type flow sensors generate pulse-train signals, the frequency of which is proportional to flow rate. The total number of pulses is a direct function of the total quantity of fluid passing through the sensor. The total quantity of each blend fluid is continously compared with the total quantity of mix. Any deviation from the preselected ratio of the blend to the total of the mix, results in repositioning of a control valve in the blend line, or additive line, in such a direction as to control the total ratio.

Various alternatives present themselves, within the contemplated scope of the invention, in the design of an overall fluid blending system. The first of these may be designated as a closed-loop system and may include a main line flow sensor for monitoring the total quantity of the mixed fluid and supplying this parameter as one input to the ratio computer; that is, the signal from the main line flow sensor is used as a master pacing signal. A second flow sensor, located in the blend line, generates another input which is supplied to the ratio computer via a ratio controller into which the desired blend percentage is preset; the signal from the blend line flow sensor being a selectively variable parameter. The output from the ratio computer is used to adjust the flow in the blend line to maintain the desired blend ratio of the mix.

A second embodiment may be designated as an open-loop system and is similar to the above described embodiment except that the pacing signal (fixed parameter) is obtained from a master clock and the alternate input (variable parameter) to the ratio computer is obtained from a blend line flow sensor in the same manner as for the closed-loop system.

Still other embodiments will become obvious to those skilled in the art after having studied these two preferred embodiments. Each of the above two described systems is subject to individual advantages and disadvantages, yet each is ideally suited to digital control and numerical techniques. Either embodiment provides apparatus for proportioning the quantities of a plurality of different fluids in which each fluid will be supplied as a percentage of the total quantity of said fluids, based upon a pacing rate which will be unity for the combined fluids. That is, there is a linear relation between the control setting and the percent composition in the blend of fluids. By adjusting the pulse train rate, whether derived from a main line flow sensor or from a master clock, the rate of production may be adjusted without disturbing the proportion of the composition.

This is accomplished by continuously totalizing the pacing signal pulses and continuously subtracting therefrom the total number of pulses from each blend and additive line flow sensor divided by the ratio of blend to total for that particular line. The algebraic sum will be zero when the absolute numerical inputs are identical; otherwise an error occurs which will signal an adjustment control valve in the blend or additive line to reduce the error in total quantity to zero. This function is accomplished by the ratio computer.

Electromagnetic counters may be employed to display the total quantities that have passed through each line. By providing a sufficient number of counter stages in the bi-directional counter of the ratio computer, it will serve as a memory in the event that the flow in any line falls outside the control range. When control is reestablished in the line the computer will automatically readjust the total mix to the previously selected ratio. As can be seen the basic concept is one of continuously comparing the total number of pulses from a master flow sensor or a master clock with the total number of pulses from each of the blend flow sensors. Different blend ratios are obtained by dividing the output of the blend flow sensor in accordance with the desired ratio of the blend to the total. In practice, the arithmetic operation of division is performed by iterative subtraction, a technique generally employed in the digital computer art. Details of the closed-loop embodiment of the invention will be considered first.

Referring now to FIGURE 1 the master fluid or stock fluid and the blend fluid are mixed and supplied via main line 1. The mixed fluid in main line 1 flows through a turbine-type flow sensor, identified as main sensor 2, which will provide a pulse train output, the total number of pulses of which is directly proportional to the total quantity of the mixed fluid. Main sensor 2 may be located remotely in the field in which case it may be desirable to amplify the pulse train by means of a preamp 3 of any suitable and well-known construction. The amplified pulse train is transmitted to the blend center, at which is located the ratio computer, via signal line 4.

In order to provide a convenient means for selectively controlling the range of the system, a preset divider 5 may be used to divide the number of pulses per unit time generated by main sensor 2 to any convenient sub-multiple. A detailed discussion of the preset divider 5 will be found in a subsequent part of this specification, it being sufficient to say at this point that controls 6 are provided for selectively determining the number of pulses to be sent to the bi-directional counter 9 for a given number of pulses generated by the main sensor 2. A pulse counter identified as total indicator 10, may be connected to line 7 to indicate the quantity of fluid passing through the main sensor 2 in a given time. This may be an electromechanical counter of any suitable and well known type, it being required only that it have an operating speed consistent with requirements of the overall system. The pulse train signal on line 7 is also supplied to the "add" input 8 of the bi-directional counter 9. The alternate or "subtract" input 11 to the bi-directional counter 9 is derived from a flow sensor in the blend line.

The fluid to be blended with the stock fluid entering main line 1 is injected at T-junction 12 via blend line 13. Flow in this line is regulated by control valve 14 and is monitored by a blend-line flow sensor. In order to provide a high degree of resolution and accuracy over a wide range of flow rates, two flow sensors may be placed in the blend line 13, one being a high range sensor 15 and the other a low range sensor 16. At low rates of flow in blend line 13, by-pass valve 17 is closed, thus channeling all of the flow through the low range sensor 16. At rates of flow exceeding the upper limit of sensor 16, by-pass valve 17 is fully opened and the monitoring of the flow is obtained from high range sensor 15.

Inasmuch as the blend line 13 may be located in the field away from the blend center, it may be desirable to amplify the pulse output from the blend line flow sensors 15 and 16. Accordingly, preamps 18 and 19 are provided for sensors 15 and 16, respectively.

In a practical system, the pulse rate output from the low range sensor 16 is of a higher order than the pulse rate from the high range sensor 15 at a comparable flow rate (i.e. the overlapping region at the upper limit of the low-range sensor 16 and the lower limit of the high-range sensor 15). Therefore, a frequency divider 20 may be placed in the signal carying line 21 from the low range sensor. This frequency divider may be of any suitable and well-known construction and may operate by digital counting techniques. Selector switch 22 is used to connect the system to the appropriate flow sensor. In the position shown in FIGURE 1, switch 22 is connected to the high-range sensor 15; in this operating mode by-pass valve 17 would normally be open.

An appropriate scale factor may be applied by the means of the scale adjustment 23. The scale adjustment 23 normalizes the pulse rate to a value which will permit the blend ratio to be entered directly in units of blend percentage. Since the output from the low-range sensor 16 is adjusted to be compatible with the output from high range sensor 15 by means of frequency divider 20, the output obtained via switch 22 may be operated upon uniformly without regard to the absolute pulse rate of the "in service" flow sensor. The scale factor adjusting means 23 may comprise a preset counter of the type referred to previously in connection with preset divider 5. The output from scale adjustment 23 may be provided with a totalizing counter 28, similar to that shown at 10, for indicating the quantity of additive or blend fluid passing through line 13 in a given time. Since it may be desired to accumulate the total of the blend fluid by total indicator 28 in coarser units than the basic counting unit of the system, a frequency divider 29 of the count-down type may be interposed between the scale adjustment 23 output and the total indicator 28. This will, therefore, reduce the required digital capacity as well as the counting rate requirement of the totalizing counter 28.

The total flow of the mixed fluid in main line 1 is obtained from main sensor 2 having, for example, an output of 100 pulses per barrel. The pulse train signal from the main sensor 2 is divided by 10 in pre-set divider 5 to provide a constant one pulse per tenth of a barrel which is supplied via line 7 to add input 8 of bi-directional counter 9.

The flow sensor in the blend line 13 need not be designed so that each pulse generated corresponds to an integral multiple or submultiple of the units used to indicate the quantity of fluid passing through the flow sensor. The scale adjustment included in the system performs a normalizing function which permits the outputs from the flow sensor to be operated upon directly, with the system, regardless of the flow sensor calibration factor. This is, the effective output frequency of the flow sensor for a given flow rate, following normalization, may be selected to provide a convenient numerical relationship with system requirements. This facilitates direct numerical control in presetting the blend ratio. The pulse train signal derived from the blend line flow sensor is supplied as an input to ratio controller 30. Ratio controller 30 is a preset electronic counter which divides the signal to provide the proper blend ratio. In a typical system, the blend ratio may be quickly and accurately adjusted to three significant figures. The desired ratio is entered in direct percentage units by means of three decimal dials 31–33 providing a setting accuracy, in the present example, of 0.1 percent.

The ratio controller 30 divides the output obtained from the blend flow sensor via the scale adjustment 23 by the blend percentage desired for the mixed fluid. For example, if the blend fluid is to comprise 25 percent of the total mix the ratio controller dials 31–33 are set at 25.0. With the ratio set at 25.0, the ratio controller 30 divides by 250. Using a normalized blend flow sensor output of 1,000 pulses per barrel, the output of the ratio controller 30 will then be 4 pulses per barrel.

The example just discussed is based on the derived signal from the main sensor 2 corresponding to 1 pulse per barrel and the derived signal from the blend corresponds to 4 pulses per barrel to provide a blend ratio of 25 percent, accurate to 0.1 percent. To increase the resolution and accuracy of the system, the blend sensor may be made to provide 10,00 pulses per barrel, thereby providing a ratio setting adjustment accuracy to 0.01 percent.

It should be pointed out here that there is a distinct advantage in dividing the pulse train signal from the blend flow sensor to provide the blend ratio rather than multiply the pulse train signal from the main sensor 2. If the pacing signal from the main sensor 2 is multiplied to establish the blend ratio it will not be posible to employ a preset counter similar to that comprising the ratio controller 30. For example, to obtain a 25% blend ratio it would be necessary to divide by 40. The next closest settings are 39 or 41, giving ratios of 24.4% and 25.6%, respectively, which is insufficient resolution. It is not feasible merely to label the dials inversely to make them read directly in percentage because a number cannot be inverted digit by digit; as for example: 1/4.1=.243, 1/3.1=.322.

A further advantage of placing the ratio controller between the blend flow sensor and the subtract input to the bi-directional counter is that the amount of fluid represented by one pulse going into the bi-directional counter varies with the blend ratio setting. If the percentage is low each pulse represents a small amount of fluid, but if the percentage is large each pulse represents a larger amount of fluid. If the ratio controller were placed between the add input of the bi-directional counter and the source of the pacing signal each pulse would represent a fixed quantity of fluid. Therefore, at low blend rates a few pulses would represent a large error expressed as a percentage of the particular mixture. At a high ratio setting the same number of pulses may represent an undesirably small error. The invention shown in FIGURE 1 results in each pulse representing a fixed percentage error and alarm trip points may be kept standardized throughout the system for all blend ratio settings.

As discussed previously, the pacing signal, corresponding to the total mixture, has continuously subtracted therefrom the total number of pulses obtained from the blend line flow sensor divided by the ratio-blend-to-total. This arithmetical operation is performed by digital-differential means. This digital-differential means may comprise a bi-directional pulse counter which increases or decreases the accumulated total by one unit for each incoming pulse as determined by which of two input lines the incoming pulse arrives on. Pulses corresponding to the main line signal are added and pulses corresponding to the blend line signal are subtracted. The output from the bi-directional counter representing the accumulated total of the two inputs, will be zero unless there is a difference in the total number of pulses received at the two inputs. An electrical signal is available at the output line 35 and may be used to ultimately regulate control valve 14. Any deviation from the preset blend ratio causes a change in the output on line 35 and ultimately repositions valve 14 to bring the blend ratio within the preset ratio. The particular type of bi-directional counter employed is not a limitation upon the invention; there being a number of well-known devices of this type which may be satisfactorily employed. However, it will be obvious to those skilled in the art, that the desired resolution of the system is the determinant in selecting the digital capacity of the system elements. There is shown in FIGURE 5 the logic diagram for a four-stage reversible binary counter suitable for use as the bi-directional counter 9 shown in FIGURES 1–4, and 9. It is understood that counters with any number of stages may be employed; the method of assembly being simple repetitions of the four-stages shown in FIGURE 5. Although the logic shown is for a straight binary counter, it will also be appreciated by those skilled in the art that various feedback connections may be employed to result in bi-quinary, decimal or other counting systems having other radices than the radix two (binary).

When the overall logic diagram of FIGURE 5 is broken down into submodules, it becomes apparent that the reversible binary counter comprises five flip-flops 50–54, six AND gates 55–60, and OR gates 61–64. Flip-flop 50 is the control or setting flip-flop which is operated in a set-reset manner, as determined by the desired direction of counting (viz, add or subtract). The desired direction of counting is a function of the source of the input pulses; add signals correspond to the pacing signal and are supplied to add input 8 while subtract signals are derived from the blend line flow sensor and are applied to the subtract input 11. Flip-flops 51–54 comprise the storage register. The configuration of the storage register at any given time, will represent the algebraic sum of add pulses and subtract pulses supplied to the bi-directional binary counter subsequent to the initial reset time.

A reset stage (flip-flop 50) is used to place the storage register in its initial or zero-indicating state. The actual circuits to accomplish this are well-known and therefore are not shown, it being understood that a reset switch establishes the desired voltage levels to place all of the flip-flops in desired configurations of conducting and non-conducting states. Assume that flip-flops 51–54 are all in the ZERO state as established by operation of a reset switch. Then, as an input pulse is applied to the add input 8, flip-flop 50 is cut off and the add bus 65 is at minus voltage level as indicated at 67 of the wave form of FIGURE 6. The same input pulse is also routed through OR gate 61 to flip-flop 51 and changes its state to 1 0. When the right hand side of flip-flop 51 has changed state in the direction from 1 to 0, an input would have been routed through AND gate 55 but for the fact that the second input to AND gate 55 is connected to the subtract bus 66 which is at ground potential.

One input to AND gate 56 is connected to add bus 65 which is at a negative voltage level corresponding to 67 of the wave form of FIGURE 6, but since the left hand side of flip-flop 51 changed state from 0 to 1 no output will appear on line 69. The bi-directional counter has now received one input pulse and this information is stored as 0001 in flip-flops 51 through 54.

Now assume that another input pulse is applied to add input 8. Although this pulse does not change the state of the control flip-flop 50, it serves to trigger flip-flop 51 which reverses its state to 0 1.

This change of state will transmit a negative voltage through OR gate 62, be inverted, and the resultant positive pulse 68 used to trigger flip-flop 52. This changes the state of flip-flop 52 to 1 0. The count is now stored as 0010 in the storage register.

Assume now that a pulse is applied to the subtract input 11. This pulse causes the control flip-flop 50 to change state, causing the subtract line 66 to assume negative voltage level 67. The same input pulse triggers flip-flop 51 reversing it to the 1 0 state. This change of state permits a pulse output to pass through AND gate 55 thereby triggering flip-flop 52 back to the 0 1 state.

The register now has stored therein the total count as 0001 and has, therefore, shown that it can cycle in a forward direction (add) as well as in a backward (subtract) direction.

The storage capacity of the register may be expanded by the addition of cascaded flip-flop stages and their associated gate structures. The output is derived by looking at the voltage or current levels of the flip-flops as determined by their conducting and non-conducting states. A 1 0 state may be made to supply a current level which is summed with current levels from other states of the register in a ladder network to provide an output current amplitude directly proportional to the magnitude of the number stored in the register. A ladder-type resistor network 36 is supplied with the output from the bi-directional counter 9. This network 36 sums the individual current levels indicating the number extant in the register of the bi-directional counter 9 to a single current, the amplitude of which is proportional to the deviation of the output of bi-directional counter 9 from zero. Sensitivity or gain adjustment may be readily provided in this network in a manner well known to those skilled in the art; that is, with a change in gain the amount of valve motion for each count in the bi-directional counter will change. With a higher gain each count gives more motion of the valve. The current-amplitude signal from ladder network 36 is supplied to D.C. amplifier 38 via line 37. The amplified current signal is supplied on line 39 to electro-pneumatic converter 40. Any suitable and well-known type of electro-pneumatic converter, adapted to receive a current amplitude input and provide a directly proportional air-pressure signal output may be used. The air-pressure signal output from electro-pneumatic converter 40 operates pneumatic valve actuator 41. This in turn mechanically positions control valve 14 to regulate the flow of fluid in blend line 13. The elements between the output 35 of bi-directional counter 9 and control valve 14 comprise a digital-to-mechanical-analog converter; the particular structure disclosed should be considered as merely exemplary and not limiting since other types of converters may be employed. An alternative embodiment of this portion of the invention will be discussed in a subsequent section of the specification with reference to FIGURES 3 and 4.

The function of the bi-directional counter may be seen by reviewing the original example; if the blend ratio is 25 percent, there will be four pulses supplied to the subtract input 11 for each barrel of fluid that passes through the blend line. Only one pulse will be supplied to the add input 8 of the bi-directional counter 9 for each barrel in the main line. Thus, the system will control in the ratio of four barrels in the main line 1 to each single barrel in the blend line 13.

The bi-directional counter, and particularly, the digital capacity provided the higher order counting stages beyond that required for normal blending adjustments, will serve as a memory 34 to accumulate the error in the event that the flow in the blend line is temporarily interrupted or should otherwise fail. When the flow has been restored, the bi-directional counter 9 gradually returns to zero at which time normal control resumes. By adjusting the count-down scale of ratio controller 30 a proper setting is obtainable so that the pulse rate generated from the blend line flow sensor corresponds, at the subtract input of the bi-directional counter 9, to the input from the main sensor 2.

If the rate of flow in main line 1 is changed by throttling at any point in the system, it is obvious that the system will automatically compensate for this through action of the bi-directional counter 9 by causing the rate of flow of the blend fluid to change correspondingly, so as to maintain the preset proportion of the blend fluid to the mixture. If the flow of the blend fluid from its source is changed to an amount greater than can be compensated for the operation of the bi-directional counter 9 and its associated control valve 14, an electrical alarm may be made to operate so as to stop the flow of both fluids until the cause of the trouble is corrected.

Since the blending control is accomplished by means of digital signals, there is no limitation as to the relative sizes of the flow sensors, pipe lines, valves, etc. The fluid handling equipment will naturally be selected in accordance with the relative amounts of the different fluids to be blended and flow sensor pulse rate per unit volume may be selected in accordance with the range of fluid flow suitable for input to the bi-directional counter within the desired range for use in the system.

A significant advantage of a digital ratio computer, over a purely mechanical system, is that the input parameters may be changed simply by setting the controls. Electronic techniques, being particularly adaptable to digital systems, further permit wide separation between the location of the ratio computer and the fluid handling apparatus. To accomplish a similar function by purely mechanical means requires gear and/or cam adjustments and imposes severe restrictions on remote operation.

In a digital system arbitrary adjustment of the input parameters may be conveniently made by means of preset counters, as referred to in connection with the discussion of preset divider 5 and ratio controller 30. A preset counter produces an output pulse after it has received a number of input pulses determined by the setting of the controller dials. Thus it may serve as a variable-ratio frequency divider.

There is shown in FIGURE 7 a circuit in which cascaded flip-flop stages can be made to count to a preset count. The method employed in the embodiment shown is to preset into the counter's register, before counting begins, the complement of the desired count. The counter then counts pulses, arriving on input line 96, from this preset count up to the full count after which it resets to the zero count. For example, if we wish to preset the counter so that it gives an output or "carry" pulse on line 97 after 6 input pulses, 4 (the complement of 6) is preset into the register. Therefore, by binary addition:

0.100 decimal 4, preset into register
0010 complement of 6 (10−6=4)
0010 decimal 2, supplied by lower feedback loop
0100 decimal 4, supplied by upper feedback loop
0110 decimal 6, time serial pulses supplied to first flip-flop
$\overline{10000}$ decimal 16, with output carry pulse The cascaded flip-flop stages 70–73 are wired in a conventional chain. A group of binary-wired number preset switches 74–77 are connected to the binary counter chain. These switches are wired in a reverse binary fashion so that the complement of the number is added in parallel to the counter bank. The preset number is not added to the counter bank until a positive voltage pulse arriving on line 78 is supplied to the grid 79 of the thyratron preset tube 80. When the thyratron fires, it conducts heavily so that nearly 100 volts is supplied to the preset inputs (83–86 or 87–90) of the flip-flops. The RC network comprised of resistor 81 and capacitor 82 in the plate circuit of the thyratron drops the plate voltage (when the heavy plate current is drawn) below the voltage required to maintain the thyratron conducting. The thyratron 80 is thus automatically turned off. The large positive pulse supplied to the preset inputs (83–90) of the flip-flops (70–73) insures that the desired complement number is added to the counter bank. As will be obvious to those skilled in the art, a small negative preset voltage can be used if a negative power supply is employed. Operating potential for thyratron 80 is supplied through resistor 91. Diodes 92–95 prevent reverse-current through the switch-arm circuits.

The feed-back loops necessary to perform the circuit logic may include wave-shaping RC elements such as resistors 96, 100 and capacitors 98–99 as is well-known to those skilled in the art.

The advantage of the complement preset counter is twofold. First, the counter operates as a conventional feedback decade until an electronic preset command is given. This command also automatically clears any count remaining in the counter. Second, any number of binary wired switches (or permanent configuration lines) can be connected to the small counter bank with diode isolation between preset lines to prevent interaction or back circuitry. Thus, it is possible to have a single counter count automatically in sequence as follows: 1, with an output carry; 1, 2, with output carry; 1, 2, 3, with output carry; 1, 2, 3, 4 with output carry; and so on until it counts as a normal decade counter.

The description of the systems thus far have been confined to the most elementary blending situation in which only two fluids are blended together. To provide mixtures of three or more fluids, the system may be expanded in the manner shown in FIGURE 9. The master fluid enters main line 101 at main-line inlet 102. The first additive fluid enters at T-juncturion 103. The second additive fluid enters main line 101 at T-junction 104. The pacing signal is a linear function of the total fluid flow through line 101.

Assuming an open-loop configuration, the pacing signal is generated by master clock 105. The pulse train from master clock 105 is supplied to the add input 106 of bi-directional counter 107 and is also supplied to the add input 108 of bi-directional counter 109. The signal supplied to the subtract input 110 of bi-directional counter 107 is derived from additive-line flow sensor 111, via ratio controller 112. The subtract input of bi-directional counter 109 is derived from additive-line flow sensor 114 via ratio controller 115. The output of bi-directional counter 107 comprises an error signal supplied to digital servo 116, which in turn operates control valve 117 via valve actuator 118. Similarly, the output from bi-directional counter 109 is supplied as an error signal to digital servo 119 which in turn operates control valve 120 through valve actuator 121.

A closed-loop configuration of a system for blending three or more fluids is similar to that described above except that master clock 105 is replaced by main flow sensor 122 and its associated pulse-modifying circuits similar to divider 5, shown in FIGURE 1. As can be seen, in either configuration the blend ratios are entered in direct percentage units of the total flow in main line 101.

It will be obvious to those skilled in the art that additional blend or additive lines with their associated elements may be coupled into the main line, it being required only that the bi-directional counter associated with each additive line have as its add-input signal the master pacing signal.

There is shown in FIGURE 2 a fluid blending system employing the open-loop mode of operation. The manner in which the blend-line signal is derived and supplied to the subtract input 11 of the bi-directional counter 9 is identical with that shown and described in connection with FIGURE 1. However, the add input 8 is supplied with a signal obtained from master clock 42 via line 43 rather than the circuit elements associated with line 7 of FIGURE 1.

Master clock 42 supplies a pulse train, the pulse repetition rate of which corresponds to the desired rate of production of the fluid mixture in main line 1. In practical systems, given rates of production are usually established as a fixed operating parameter. Consequently, the need to monitor the rate of production and utilize it as a variable parameter in the process control is obviated. A digital counter identified as total indicator 44 is supplied with the pulse train signal from the master clock to indicate the total quantity of the mixture produced.

An ancillary advantage of an open-loop system is its inherent stability since "hunting" or oscillation about the mean production rate is eliminated. On the other hand, a closed-loop system, as first described above, permits the rate of production to be varied without affecting the preset blend ratio.

In addition to the open-loop and closed-loop embodiments of the invention, other modifications of the system are also contemplated. For example, there is shown in FIGURE 3 a modification of the apparatus of FIGURE 2 in which the output from the bi-directional counter 9 is used directly in digital form. As discussed previously, the output from bi-directional counter 9 represents the numerical difference between the inputs appearing on add input 8 and subtract input 11. This numerical output information may be supplied as a line code to digital servo 46. Digital servo 46 supplies full-forward or full-reverse driving signals to stepper motor 47 causing it to rotate a fixed amount until the error signal comprising the forward or reverse drive signals as derived from the servo, returns to zero. As will be evident to those skilled in the art, each fixed step of the stepper motor 47 may be made to correspond to a setting adjustment of control valve 14 which will alter the rate of flow in blend line 13 by an amount substantially equal to the basic unit of measurement of the system. That is, for example, each step of the stepper motor 47 may be made to adjust the flow through valve 14 in increments of 1/10 barrel per minute assuming that the system is calibrated in terms of barrels per minute and the resolution of the system is 0.1 percent. The use of discrete steps in the fluid-control portion of the system aids in defining the width of the dead band, or region of no servo response, thus improving the stability of the system's operation.

Similarly, digital servo control techniques may be applied to the operation of control valve 14 of the apparatus of FIGURE 1. There is shown in FIGURE 4 a portion of the apparatus of FIGURE 1 modified to include a digital servo 48 and a stepper motor 49. Typical operation of the systems would then be as follows; if the numerical output of bi-direction counter 9 is two units, the digital servo 48 will cause stepper motor 49 to open valve 14 two increments from its mean setting. Conversely, if the output from bi-directional counter 9 is a minus two, the digital servo 48 will cause stepper motor 49 to rotate in a reverse direction and cause control valve 14 to throttle down the flow a corresponding amount.

In the utilization of the ratio computer of the present invention for the blending of fluids, the fluids are handled in terms of integral units such as gallons, barrels, etc. The use of turbine-type flow sensors facilitates monitoring flow in such units. However, the input transducers need not comprise turbine-type flow sensors, it being only necessary that the input information be of a discrete nature.

Figure 8:
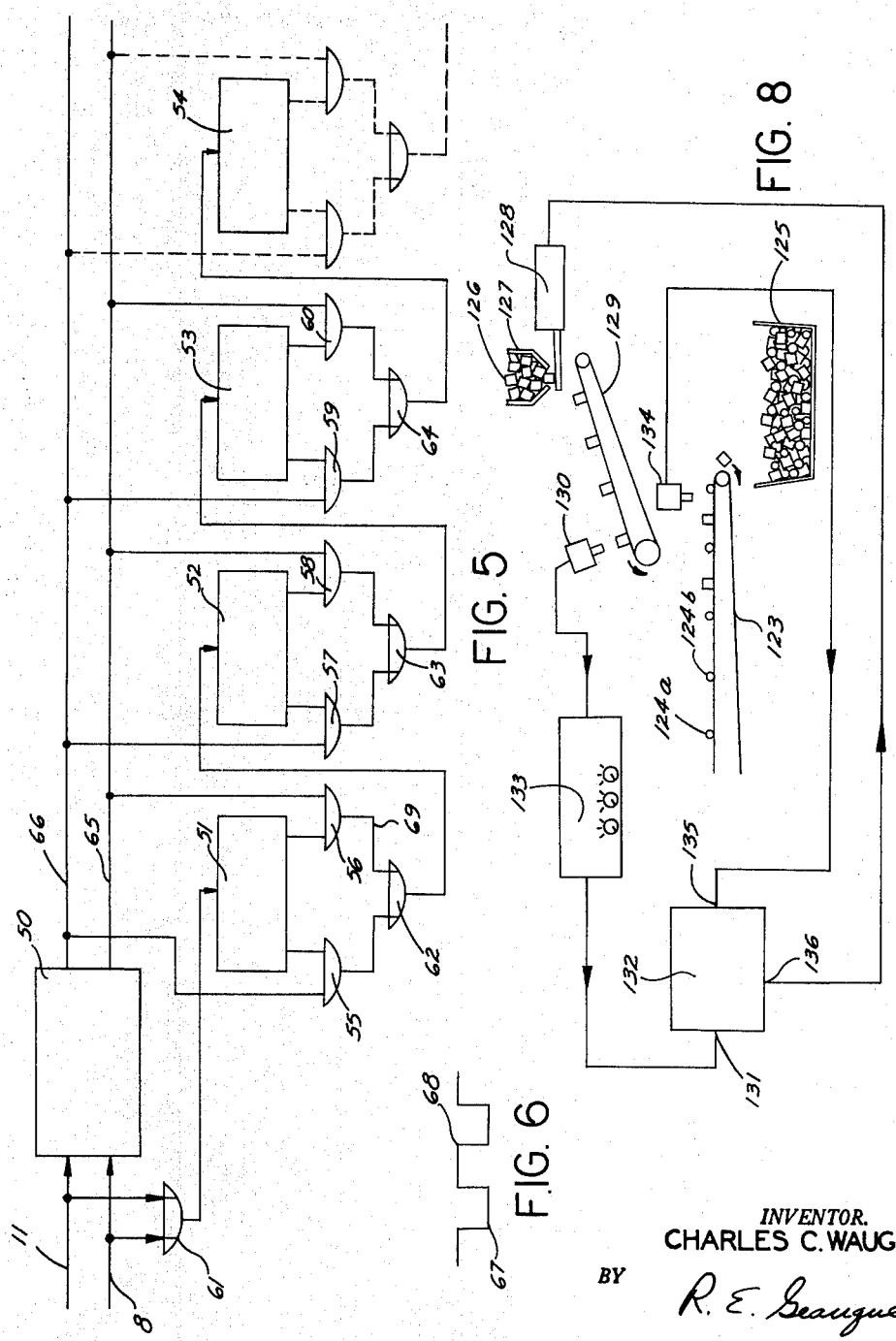
FIGURE 8 is a block diagram of an embodiment of the invention useful for continuous process control of discrete materials.
Figure 9:
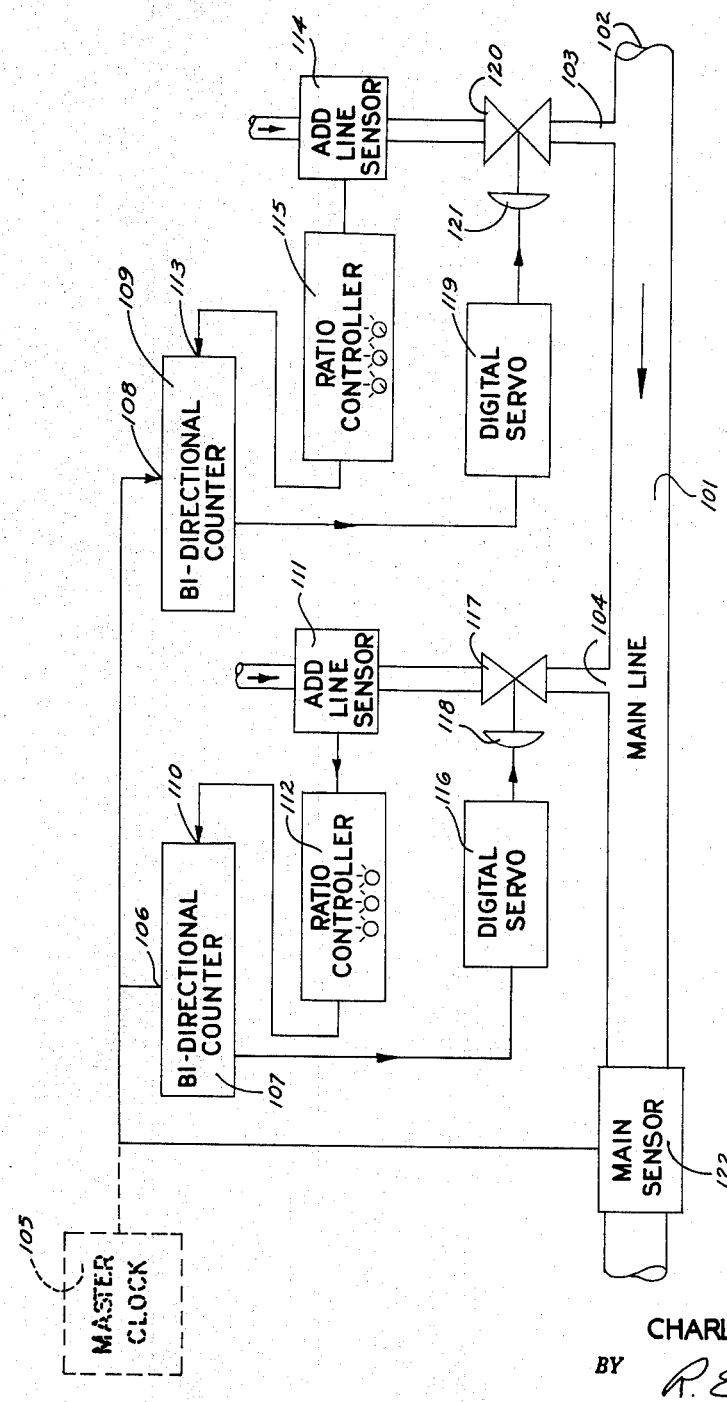
FIGURE 9 is a block diagram of an embodiment of the invention in which a plurality of add lines are connected with the main line.

This utilization of the invention may be seen by the apparatus of FIGURE 8. In this instance the turbine-type flow sensing transducers may be replaced with tactile switches, photoelectric pickups or other transducers which will generate one pulse for passage of each unit through the system. Conveyer 123 operating at a fixed rate carries stock items 124a, 124b, etc., into container 125. Additive items 126 in supply hopper 127 may be released at a controlled rate by electromechanical gate mechanism 128 onto conveyor 129. The items on conveyor 129 are individually sensed and/or counted by the transducer 130 which in turn supplies a pulse train signal to the subtract input 131 of bi-directional counter 132 via ratio controller 133. Additive items supplied by conveyor 129 are mixed with the stock items supplied by conveyor 123 and the mixture is transferred to container 125. A running total of the number of units comprising the mixture transferred into container 125 is obtained via transducer 134. This count is entered into the add input 135 of bi-directional counter 132.

Assuming that it is desired to provide a mixture in container 125 comprising one additive item 126 for every five of stock items 124, the ratio controller 132 would be set at "twenty" corresponding to a mixture ratio of 20 percent. Operation of the system would then be as follows: during the time that transducer 134 has supplied five pulses to the add input 135, one additive item will have been sensed by transducer 130 and zero output will appear on line 136. Thus, the gate mechanism 127 will remain at its initial setting. Assuming, however, that five items have been sensed by transducer 134 and no items have been sensed by transducer 130; this would indicate that all five items are stock items 124. Consequently, an error signal of one unit will appear on line 136 from bi-directional counter 132. This error signal will open gate 128 to allow additional units to pass from hopper 127 onto conveyor 129, thus making up the shortage.

All that is necessary to change the percentage ratio is to adjust the setting of the ratio controller 133 to permit any desired total number of units to be counted by transducer 134 before an error signal will be generated by bi-directional counter 132 in response to the shortage of count signals from transducer 130.

As in the case of previously described embodiments of the invention, the placement of the ratio controller in the subtract input line of the bi-directional counter, rather than the added input line, has the advantage that the preset number is entered directly in percentage units whereas if it were in the add input line, it would be necessary to have it read in inverse percentage (reciprocal or non-integral units).

While only a limited number of forms of the novel ratio computer of the invention have been described herein, it will be understood that the invention may be embodied in many other forms without departing from the underlying principles. It is, therefore, obvious that the invention is not limited to the forms described herein, but is capable of a wide variety of embodiments. Various changes which will now suggest themselves to those skilled in the art which may be made in the form, details of construction, and arrangement and connection of the elements without departing from the invention. It is, therefore, to be understood that the invention encompasses all forms thereof that come within the scope of the appended claims.

I claim:

1. In a system for controlling the percentage of an additive material in a mixture of materials, first transducer means for generating an electrical pulse for each unit of said mixture, second transducer means for generating an electrical pulse for each unit of said additive material, ratio controller means for dividing the frequency of the pulses from said second transducer means by a factor corresponding to the percentage of said mixture which said additive material is to comprise, and a bi-directional pulse counter connected to both said first transducer means and to said ratio controller means and adapted to add the pulses from said first transducer means and subtract the pulses from said ratio controller means, and control means coupled to said bi-directional pulse counter for varying the quantity of said additive material supplied to said mixture in response to the output of said bi-directional counter, thereby controlling the percentage of said additive material in said mixture.

2. A fluid-blending system as defined in claim 1, wherein said means for producing said second train of discrete electrical pulses includes means for adjusting the scale factor of the pulse train to provide an electrical signal representing a sub-multiple of the quantity of fluid flowing through said secondary passage.

3. A fluid-blending system as defined in claim 1 including means for providing a sub-multiple of said second pulse train, said sub-multiple being supplied to said digital-differential controller.

4. A fluid-blending system as defined in claim 3 wherein said means for producing said sub-multiple pulse train comprises a preset counter for supplying a single pulse after having received a given number of input pulses and means associated with said preset counter for selecting the ratio between the second pulse train and the sub-multiple pulse train in order to pre-select the ratio between the flow entering the main flow line and the flow in the secondary flow passage.

5. A fluid-blending system as defined in claim 1 further including temperature indicating means associated with said secondary passage and scale factor adjusting means for dividing the frequency of said second pulse train to compensate for variations in temperature as indicated by said temperature indicating means.

6. A control device for a liquid blending system wherein a plurality of liquids flow through individual flow paths into a common receiver, said system comprising means for generating a pulsed electrical control signal whose pulse recurrent frequency is adjustable to set the sum of the individual flow rates of said liquids; and a plurality of flow control assemblies, each of which is responsive to and operative on the flow rate of one of said liquids and each of which comprises: (1) a pneumatically operated valve positioned in the flow path of said liquid and controlling its rate of flow therein, (2) a turbine flow meter positioned in the flow path of said liquid and generating a pulsed electrical signal whose pulse recurrence frequency is proportional to the flow rate of said liquid in its flow path, (3) means for amplifying said pulsed electrical signal, (4) pulse dividing means receiving the amplified signal and producing a primary pulsed signal of which $10^k$ pulses represent a unit volume of said liquid flowing in its flow path, $k$ being a small whole number, (5) a pre-set decade pulse counter receiving said primary signal and producing a secondary pulsed signal of which $n$ pulses correspond to said unit volume of liquid, $n$ being equal to the reciprocal of the desired ratio between the volume of said liquid and the sum of the volumes of all of said liquids flowing into said receiver, (6) a reversible binary counter receiving said secondary signal and said control signal and producing a direct current error signal having a potential which is proportional to any difference between the pulse recurrence frequencies of said secondary signal and said control signal, said potential being above or below a fixed reference potential depending on which of said pulse recurrence frequency rates is the greater, and said reversible binary counter including an anti-coincident circuit at its input, (7) an integrating amplifier receiving said error signal and producing an error signal whose pressure is proportional to the potential of said amplified error signal, (9) and means for transmitting said error signal to said valve whereby the latter operated in response to variations in the pressure of said air signal in such manner as to equate the potential of said error signal to said reference potential.

7. A device as described in claim 6 wherein said fixed reference potential is such that said valve is at its approximate midpoint position when the potential of said error signal equals said reference potential and is at its closed position when the potential of said error signal equals ground potential.

8. The method for maintaining a pre-selected relationship between the respective flow rates of a plurality of materials flowing in individual flow paths which comprises: generating a pulsed electrical control signal whose pulse recurrence frequency is proportional to the sum of the flow rates of said materials; and for each of said materials: (1) determining the flow rate thereof, (2) representing said material by a primary pulsed electrical signal of which a predetermined fixed number of pulses represents a unit quantity of said material flowing in its flow path, (3) dividing the pulse recurrence frequency of said primary signal by a factor which is equal to the ratio between the desired flow rate of said material and the sum of the desired flow rates of all of said materials, thereby producing a secondary pulsed electrical signal of which $n$ pulses represent said unit quantity of material, wherein $n$ is equal to the reciprocal of the desired ratio between the flow rate of said material and the sum of the flow rates of all of said materials, (4) determining any difference between the pulse recurrence frequencies of said secondary signal and said control signal and generating an error signal whose magnitude is proportional to the magnitude of said difference, and (5) varying the flow rate of said material in response to changes in the magnitude of said error signal in such manner as to equate said error signal to zero.

9. A liquid blending control for a multi-liquid blending system comprising: a control pulse signal generator the pulse repetition frequency of which is settable to a value corresponding to the sum of the individual flow rates of the liquids being blended; a plurality of flow control assemblies, each, respectively, including flow control means being responsive to the flow rate of one respectively of said liquids being blended to adjust the rate of flow thereof, and each said flow control means including an electrically operated pneumatic valve positioned in the flow path of said liquid to control the rate of flow therein, a turbine flow meter positioned in the flow path of said liquid and having means to generate a pulsed electrical signal the repetition frequency of which is proportional to the flow rate of said liquid; a ratio controller means connected to said turbine flow meter and being responsive to the signals therefrom to produce a pulsed ratio signal in response to said pulsed signal equal to the reciprocal of the desired ratio between the volume of said liquid and the sum of the volumes of all of the liquids being blended, and a pulse comparator circuit connected to said ratio controller means to receive said pulsed ratio signal and said control pulse signal to produce a direct current error signal, the potential of said error signal being proportional to any difference between the pulse repetition frequencies of said pulsed ratio signal and said control pulse signal, said potential being above or below a fixed reference potential depending on which of said pulse repetition frequency rates is the greater said comparator circuit being connected to said electrically operated pneumatic valve and being responsive to said error signal to produce a control signal for said valve to generate a pressure therein proportional to the potential of said amplified error signal whereby said valve operates in response to variations in said pressure in such manner as to equate the potential of said error signal to said reference potential.

References Cited by the Examiner
UNITED STATES PATENTS

| | | | |
|---|---|---|---|
| 2,207,949 | 7/1940 | Smith | 137—486 X |
| 2,314,152 | 3/1943 | Mallory | 137—486 X |
| 2,626,627 | 1/1953 | Jung et al. | 137—88 |

M. CARY NELSON, *Primary Examiner.*

ISADOR WEIL, MARTIN P. SCHWADRON,
*Examiners.*